(12) United States Patent
Miller et al.

(10) Patent No.: US 11,228,275 B2
(45) Date of Patent: Jan. 18, 2022

(54) METHODS AND APPARATUS FOR INSTALLING SOLAR PANELS

(71) Applicant: National Oilwell Varco, L.P., Houston, TX (US)

(72) Inventors: Travis James Miller, Cypress, TX (US); Farzad Azizi, Houston, TX (US); Ben Mintz, Houston, TX (US); Frank Benjamin Springett, Spring, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 16/912,390

(22) Filed: Jun. 25, 2020

(65) Prior Publication Data

US 2020/0412295 A1 Dec. 31, 2020

Related U.S. Application Data

(60) Provisional application No. 62/867,562, filed on Jun. 27, 2019.

(51) Int. Cl.
*H02S 20/10* (2014.01)
*H02S 20/30* (2014.01)

(52) U.S. Cl.
CPC .................................... *H02S 20/30* (2014.12)

(58) Field of Classification Search
CPC ........ Y02E 10/47; Y02E 10/50; F24S 30/425; F24S 25/12; H02S 20/32; H02S 20/10; H02S 20/30
See application file for complete search history.

(56) References Cited

U.S. PATENT DOCUMENTS

| 6,675,068 | B1 | 1/2004 | Kawasaki |
| 8,247,681 | B2 | 8/2012 | Reinisch |
| 8,459,249 | B2 | 6/2013 | Corio |
| 9,071,191 | B2 | 6/2015 | Patrick |
| 9,281,778 | B2 | 3/2016 | Corio |
| 9,318,635 | B2 | 4/2016 | Luo |

(Continued)

FOREIGN PATENT DOCUMENTS

| CN | 202912342 U | 1/2013 |
| CN | 106953588 A | 7/2017 |

(Continued)

OTHER PUBLICATIONS

Solar Robots Designed to Make Photovoltaics as Cheap as Fossil Fuels (https://www.youtube.com/watch?v=nIDks4A3GC8), The New York Times, United States.

(Continued)

*Primary Examiner* — Babajide A Demuren
*Assistant Examiner* — Daniel J Kenny
(74) *Attorney, Agent, or Firm* — Jonathan Pierce; Pierre Campanac; Porter Hedges LLP

(57) ABSTRACT

Several pre-assemblies holding panels of photovoltaic cells are constructed and pre-wired in a factory. The pre-assemblies are shipped to a solar farm, where they are lifted above posts secured to the ground using, for example, using an excavator connected to an end effector. The pre-assemblies are then connected to the posts and electrically coupled to one another. Such installation of solar panels in a solar farm may be faster and less labor-intensive than other types of installation.

19 Claims, 14 Drawing Sheets

(56) References Cited

U.S. PATENT DOCUMENTS

| | | | |
|---|---|---|---|
| 9,655,292 | B2 | 5/2017 | Swahn et al. |
| 9,708,139 | B2* | 7/2017 | Kamata .................. G01S 17/50 |
| 9,766,319 | B2 | 9/2017 | Au |
| 9,806,669 | B2 | 10/2017 | Michotte De Welle |
| 9,905,717 | B2 | 2/2018 | Au |
| 9,970,686 | B2 | 5/2018 | Au |
| 10,069,455 | B2 | 9/2018 | Corio et al. |
| 10,116,257 | B2 | 10/2018 | Newdoll et al. |
| 10,135,386 | B2 | 11/2018 | Goldberg et al. |
| 10,222,446 | B2 | 3/2019 | Au |
| 10,801,755 | B1* | 10/2020 | Nemat .................. F24S 25/634 |
| 10,931,224 | B2* | 2/2021 | Praca .................... F24S 30/425 |
| 2003/0127834 | A1* | 7/2003 | Click ...................... B62B 3/108 |
| | | | 280/651 |
| 2008/0087274 | A1 | 4/2008 | Chen |
| 2011/0240006 | A1 | 10/2011 | Linke |
| 2011/0290306 | A1 | 12/2011 | Roberts |
| 2012/0027550 | A1* | 2/2012 | Bellacicco ............. H02S 20/20 |
| | | | 414/547 |
| 2012/0073565 | A1 | 3/2012 | Grant et al. |
| 2012/0279069 | A1* | 11/2012 | Von Deylen ............ F24S 25/61 |
| | | | 29/890.033 |
| 2013/0037081 | A1 | 2/2013 | Grant |
| 2013/0118099 | A1 | 5/2013 | Scanlon |
| 2013/0269752 | A1 | 10/2013 | Corio |
| 2013/0294814 | A1 | 11/2013 | Sader |
| 2013/0340807 | A1* | 12/2013 | Gerwing ................ H01L 31/02 |
| | | | 136/246 |
| 2014/0203233 | A1* | 7/2014 | Larsen .................. E04H 17/161 |
| | | | 256/32 |
| 2014/0360552 | A1* | 12/2014 | Britcher .................. H01L 31/18 |
| | | | 136/244 |
| 2015/0207452 | A1* | 7/2015 | Werner ................. F24S 30/425 |
| | | | 136/246 |
| 2015/0377520 | A1 | 12/2015 | Kufner |
| 2016/0065121 | A1 | 3/2016 | Bugg et al. |
| 2019/0158017 | A1* | 5/2019 | Hu .......................... F24S 25/12 |
| 2019/0199276 | A1* | 6/2019 | Bailey .................. F24S 30/425 |
| 2020/0036325 | A1* | 1/2020 | Poivet ..................... H02S 30/10 |

FOREIGN PATENT DOCUMENTS

| | | |
|---|---|---|
| IN | 201641034807 A | 4/2018 |
| JP | 2013204331 A | 7/2013 |
| JP | 2016073077 A | 9/2016 |
| KR | 101227088 B1 | 1/2013 |
| KR | 20140126804 A | 11/2014 |
| KR | 20160000769 U | 3/2016 |
| KR | 20190111185 A | 10/2019 |
| WO | WO2018109524 A1 | 6/2018 |

OTHER PUBLICATIONS

Co-op Community Solar—Robots! (https://www.youtube.com/watch?v=xp6fMmXmH2M), Solar Alliance Southeast, LLC, United States.

* cited by examiner

METHODS AND APPARATUS FOR INSTALLING SOLAR PANELS

CROSS-REFERENCE TO RELATED APPLICATIONS

This application claims the benefit of priority to U.S. provisional application Ser. No. 62/867,562 filed on Jun. 27, 2019. The priority application Ser. No. 62/867,562 is incorporated herein by reference for any purposes.

BACKGROUND

This disclosure relates generally to methods and apparatus for installing solar panels.

Utility companies utilize solar farms to generate electricity and distribute it on the grid. A typical solar farm generates electrical power on the order of several hundreds of megawatts. The installation of solar panels in a solar farm is labor-intensive. There have been attempts to reduce manual labor required for solar panel installations. For example, robots that use fixed axis systems and dedicated mounting structures have been proposed. These robots require significant precision and are expensive.

Thus, there is a continuing need in the art for methods and apparatus for installing solar panels.

SUMMARY

The disclosure describes methods of installing solar panels.

The methods may comprise the step of forming a pre-assembly or a plurality of pre-assemblies at a first site. For example, the first site may be a factory. The pre-assembly or each of the plurality of pre-assemblies may include a plurality of frames and a rail. The rail may include one rail component, or a plurality of rail components joined to one another. Each of the plurality of frames may hold a panel of photovoltaic cells. Each of the plurality of frames may be mounted to the rail. For example, each of the plurality of frames may be fixedly mounted to the rail, or each of the plurality of frames may be rotatably mounted to the rail. The pre-assembly or each of the plurality of pre-assemblies may further comprise bearing subassemblies mounted to the rail.

The methods may comprise the step of forming a first arrangement of the plurality of pre-assemblies on a transportation means. The first arrangement may be formed at the first site. Some of the pre-assemblies forming the first arrangement may be flipped relative to others of the pre-assemblies forming the first arrangement. Some of the pre-assemblies forming the first arrangement may be staggered relative to others of the pre-assemblies forming the first arrangement.

The methods may comprise the step of transporting the pre-assembly from the first site to a second site using the transportation means. The second site may be remote from the first site. For example, the second site may be a solar farm.

The methods may comprise the step of forming a second arrangement of a portion of the plurality of pre-assemblies on another transportation means. The second arrangement may be formed at the second site. None of the pre-assemblies forming the second arrangement may be flipped relative to any of the pre-assemblies forming the second arrangement. A number of pre-assemblies per a given volume may preferably be larger in the first arrangement than in the second arrangement.

The methods may comprise the step of coupling a temporary support to a post or posts secured at an installation site. The temporary support may include a stand having a foot and a rest located above the foot at a height that is adjustable, a rail alignment means secured to the stand, and a rail receptacle secured to the stand.

The methods may comprise the step of lifting the pre-assembly to a position above posts secured at the second site. Lifting of the pre-assembly to the position above the post may be performed using a standard lifting means, for example, an excavator. The excavator may be connected to an end effector.

The methods may comprise the step of lowering the pre-assembly while maintaining contact of the rail of the pre-assembly against the rail alignment means.

The methods may comprise the step of engaging the rail with the rail receptacle.

The methods may comprise the step of supporting the pre-assembly on the adjustable rest.

The methods may comprise the step of adjusting the height of the rest so that the pre-assembly registers with a top of the post.

The methods may comprise the step of connecting the pre-assembly or each of the plurality of pre-assemblies to the posts. Connecting the pre-assembly or each of the plurality of pre-assemblies to the posts may comprise sliding at least one of the bearing subassemblies along the rail and connecting the bearing subassemblies to the posts. The pre-assembly may be indirectly connected to the post via one or more of an inner bearing coupled to the rail, an outer bearing movable relative to the inner bearing, and a bearing housing coupled to the outer bearing. For example, in some embodiments, each of the bearing subassemblies may consist essentially of inner bearings coupled to the rail and outer bearings movable relative to the inner bearings and connecting the bearing subassemblies to the posts may comprise coupling a first bearing housing portion to the posts and coupling a second bearing housing portion to the first bearing housing portion. In other embodiments, each of the bearing subassemblies may comprise an inner bearing coupled to the rail, an outer bearing movable relative to the inner bearing, and a bearing housing coupled to the outer bearing and connecting the bearing subassemblies to the posts comprise coupling the bearing housing to the posts.

The methods may comprise the step of adjusting the height of the rest so that the post supports the pre-assembly.

The methods may comprise the step of disengaging the rail from the rail receptacle.

The methods may comprise the step of decoupling the temporary support from the post.

The methods may comprise the step of electrically coupling the plurality of pre-assemblies to one another.

The disclosure describes a pre-assembly for expediting installation of solar panels. The pre-assembly may not be connected to any post secured at an installation site.

The pre-assembly may comprise a rail. The rail may include one rail component, or a plurality of rail components joined to one another.

The pre-assembly may comprise a plurality of frames. Each of the plurality of frames may be mounted to the rail. For example, each of the plurality of frames may be fixedly mounted to the rail, or each of the plurality of frames may be rotatably mounted to the rail. Each of the plurality of frames may hold a panel of photovoltaic cells. The plurality of frames may be pre-wired.

The pre-assembly may comprise bearing subassemblies mounted to the rail. In some embodiments, each of the bearing subassemblies may consist essentially of inner bearings coupled to the rail and outer bearings movable relative to the inner bearings. In other embodiments, each of the bearing subassemblies may comprise an inner bearing coupled to the rail, an outer bearing movable relative to the inner bearing, and a bearing housing coupled to the outer bearing.

BRIEF DESCRIPTION OF THE DRAWINGS

For a more detailed description of the embodiments of the disclosure, reference will now be made to the accompanying drawings, wherein.

DETAILED DESCRIPTION

This disclosure describes a method that involves the construction of pre-assemblies of frames, each frame holding one or more panel(s) of photovoltaic cells. The pre-assemblies are shipped from a first site, such as a factory, to a second site, such as a solar farm where the pre-assemblies are installed on post secured into the ground. This disclosure also describes a method of lifting the pre-assemblies from a transportation means, such as a truck trailer, train, vessel, or a shipping container, and positioning them on temporary supports located next to posts secured in the ground at a solar farm. The temporary supports include alignment means that do not require precise control of the lifting. Thus, a lifting means, such as an excavator, crane, jacks, gantry, lift tower, hoist, or forklift, may be used to lift the pre-assemblies. The temporary supports permit a few workers to connect the pre-assemblies to the posts and then, the pre-assemblies together. In some embodiments, the pre-assemblies may be connected together electrically as well as mechanically. In some embodiments, the pre-assemblies may only be connected together electrically.

Figure 1:
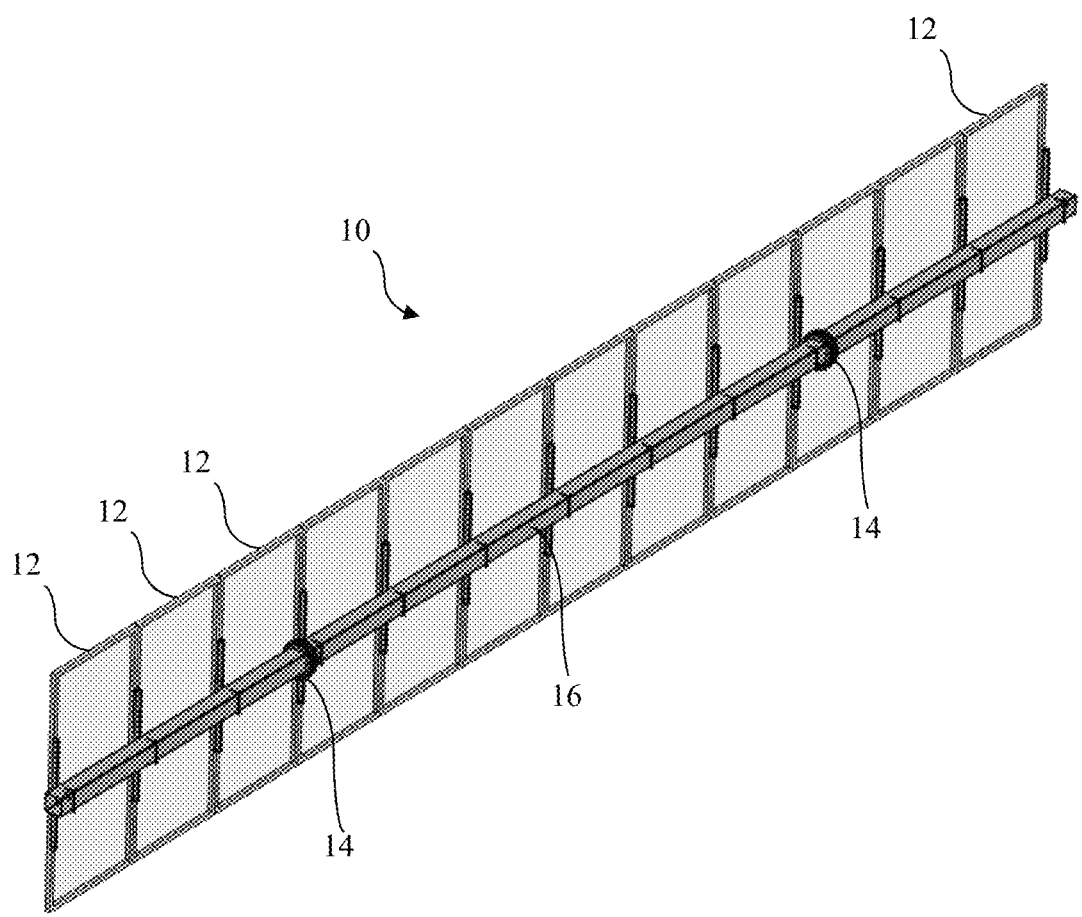
FIG. 1 is a perspective view of a pre-assembly including a plurality of frames, a rail, and bearing subassemblies.

FIG. 1 is a perspective view of a pre-assembly 10. Several of these pre-assemblies 10 are constructed, preferably in a factory.

The pre-assembly 10 includes a plurality of frames 12, a rail 16, and bearing subassemblies 14. Each of the plurality of frames 12 holds one or more panel(s) of photovoltaic cells.

Each of the plurality of frames 12 is fixedly mounted to the rail 16, for example, using clamping mechanisms. Alternatively, each of the plurality of frames 12 may be rotatably mounted to the rail 16, and may rotate around it before their installation on a solar farm.

The bearing subassemblies 14 are mounted to the rail 16 so that they can slide along the rail 16 to accommodate variations in the spacing between the posts on which they will be coupled. Alternatively, without compromising the capability to accommodate variations in the spacing between the posts on which the bearing subassemblies 14 will be coupled, one of the bearing subassemblies 14 can be mounted to the rail 16 so that it cannot slide along the rail 16, and the other of the bearing subassemblies 14 can be mounted to the rail 16 so that it can slide along the rail 16.

In the embodiment shown in FIG. 1, the bearing subassemblies 14 include a bearing housing, an outer bearing that is coupled to the bearing housing, an inner bearing that is coupled to the rail 16 and is movable relative to the outer bearing, and an optional seal. The bearing subassemblies 14 may be of different types, which can optionally, but not necessarily, allow the rotation of the rail 16 inside the bearing subassemblies 14.

The panels(s) of photovoltaic cells may be pre-wired, and the wiring tested at the factory. In some embodiments, the pre-assembly 10 may include motorization to effect rotation of the rail 16 inside the bearing subassemblies 14, and/or panel washing circuitry.

Figure 2A:
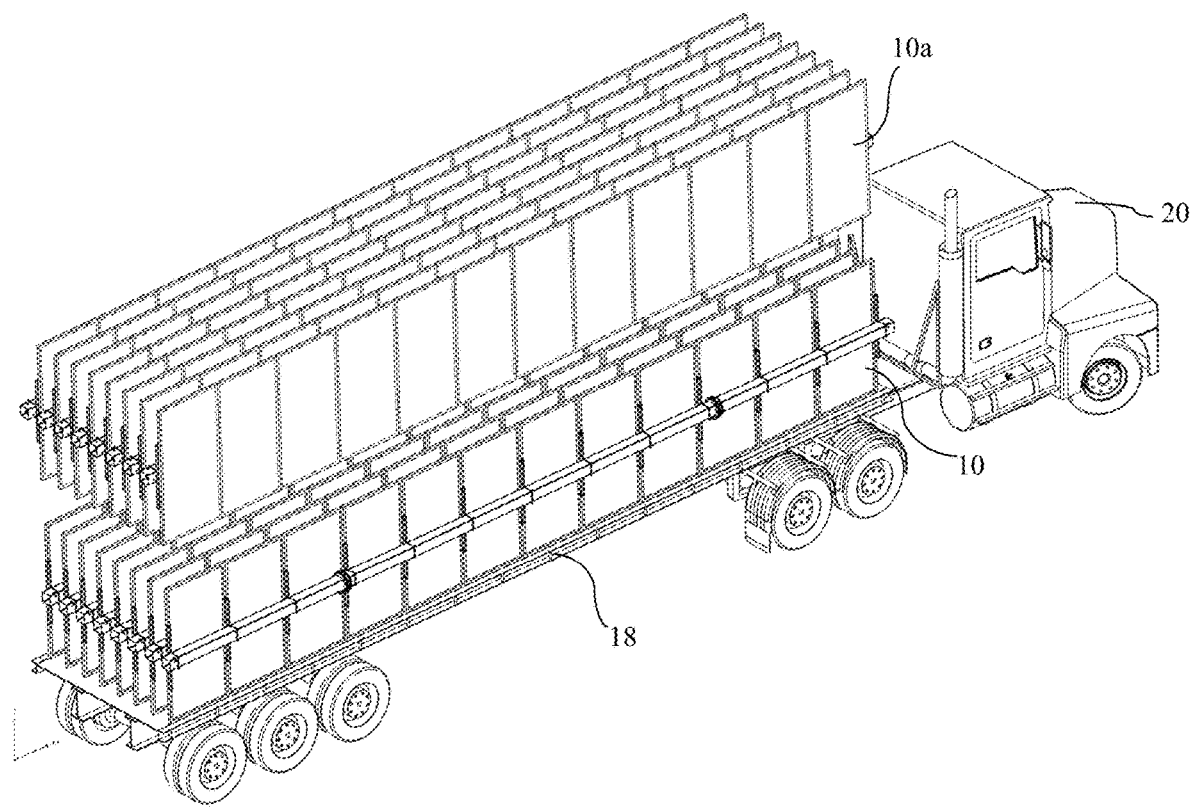
FIG. 2A is a perspective view of an arrangement of a plurality of pre-assemblies on a trailer, wherein some of the pre-assemblies forming the arrangement are flipped relative to others of the pre-assemblies forming the arrangement.

In some embodiments, a shipping arrangement of a plurality of pre-assemblies 10 may be assembled on a trailer at or near the factory. FIG. 2A is a perspective view of the shipping arrangement of a plurality of pre-assemblies 10 on a trailer 18. In the shipping arrangement, some of the pre-assemblies 10a are flipped relative to others of the pre-assemblies 10, and/or some of the pre-assemblies 10a are staggered relative to others of the pre-assemblies 10. For the sake of visibility, the pre-assemblies 10a are illustrated in FIG. 2A offset much higher than they would be during shipping. In practice, the pre-assemblies 10a would be positioned substantially next to the pre-assemblies 10, except for small vertical and horizontal offsets. Then, the pre-assemblies 10 and 10a are transported from the factory to a solar farm, which is typically remote from the factory.

The shipping arrangement may not be convenient for delivering the pre-assemblies 10 and 10a in the solar farm. However, the shipping arrangement may be relatively compact, that is, it may accommodate a larger number of pre-assemblies 10 per a given volume than other arrangements. Accordingly, the shipping arrangement may reduce the number of trailers needed to transport the pre-assemblies.

Figure 2B:
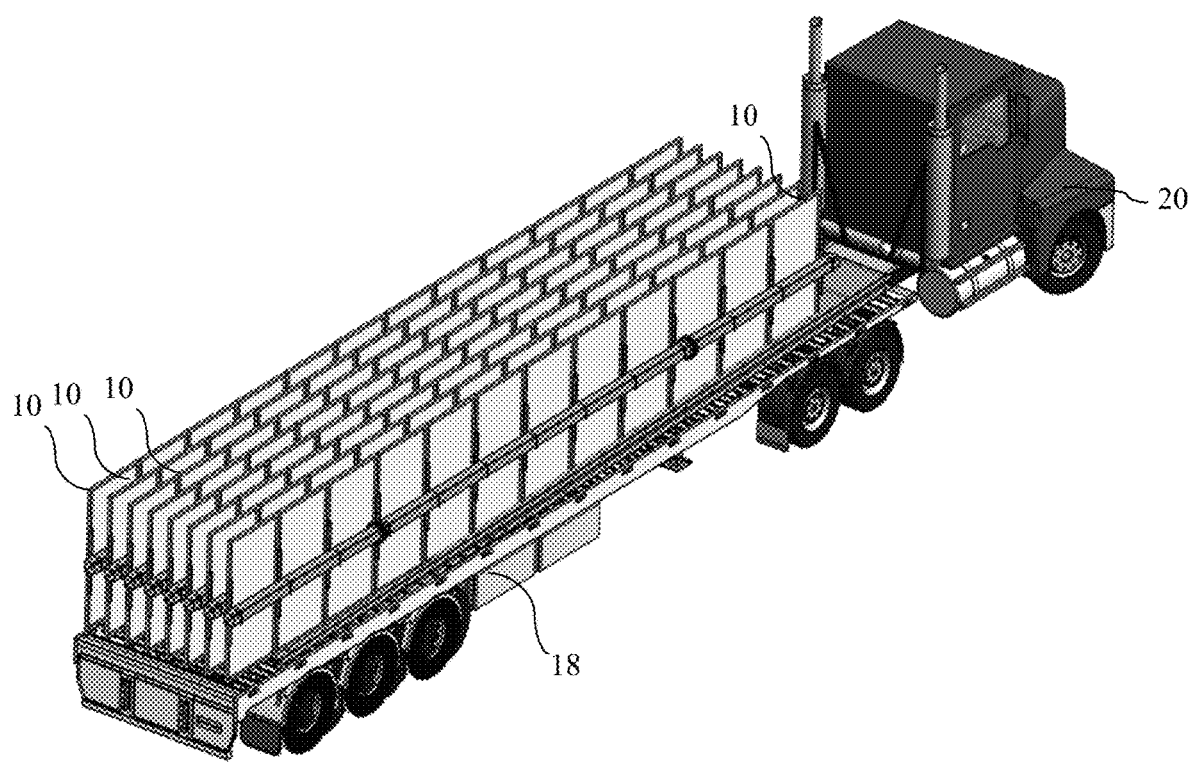
FIG. 2B is a perspective view of an arrangement of a plurality of pre-assemblies on a trailer, wherein none of the pre-assemblies forming the arrangement are flipped relative to others of the pre-assemblies forming the arrangement.

FIG. 2B is a perspective view of a delivery arrangement of a plurality of pre-assemblies 10 on another trailer 18. In the delivery arrangement, none of the pre-assemblies 10 is flipped relative to any other of the pre-assemblies 10. The trailer 18 is pulled by a truck 20 between two of three adjacent rows of posts secured into the ground at the solar farm.

The delivery arrangement may be assembled near or at the solar farm. Alternatively, the delivery arrangement may be assembled at the factory, for example, when the distance between the factory and the solar farm is sufficiently short.

While FIGS. 2A and 2B illustrate a trailer 18, alternative transportation means may be used, such as a shipping container, or other known transportation means.

Figure 3:
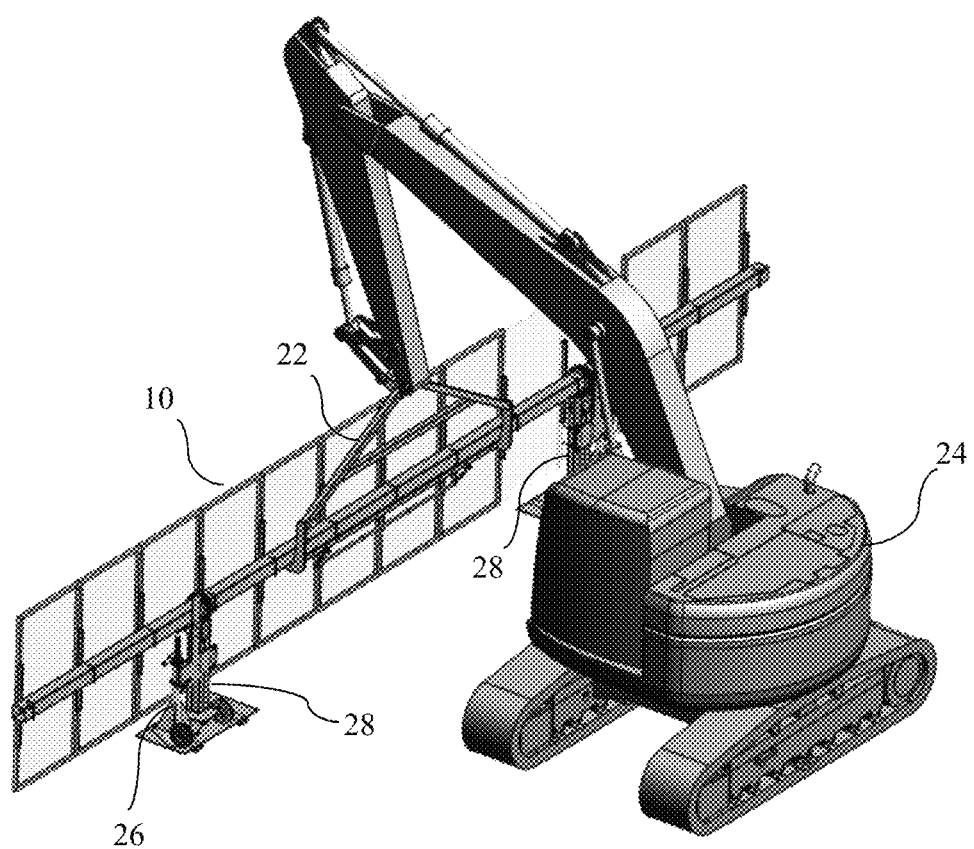
FIG. 3 is a perspective view of a pre-assembly being lifted and positioned above posts secured into the ground, with temporary supports coupled to the posts.

FIG. 3 is a perspective view of a pre-assembly 10 being lifted and positioned above posts 28 secured into the ground at the solar farm. The pre-assembly 10 may be lifted by a standard excavator 24 equipped with a specialized end-effector 22, which may drive alongside the truck 20 between the other two rows of the three adjacent rows of posts secured into the ground at the solar farm.

Workers may have previously coupled a temporary support 26 to each post 28. The temporary support 26 is used to guide, and properly position the pre-assembly 10 above the posts 28. Thus, the excavator 24 is not required to provide a precisely controlled placement of the pre-assembly 10 above the post 28.

While FIG. 3 illustrates a standard excavator 24, alternative lifting means may be used, such as a crane, jack, gantry, lift tower, hoist, forklift, or other known lifting means. As used herein, "standard" means having a typical precision that can be lower than the precision required of the robots that use fixed axis systems and dedicated mounting structures to install panels.

Furthermore, while FIG. 3 illustrates a lifting means equipped with a specialized end-effector 22, the lifting means may alternatively be equipped with a spreader bar, and a plurality of tension members suspended from the spreader bar and capable of holding the rail 16. For example, the tension members may include cables or chains wrapped around the rail 16, hooks supporting the rail 16, or other known tension members suspended from the spreader bar and capable of holding the rail 16.

Figure 4:
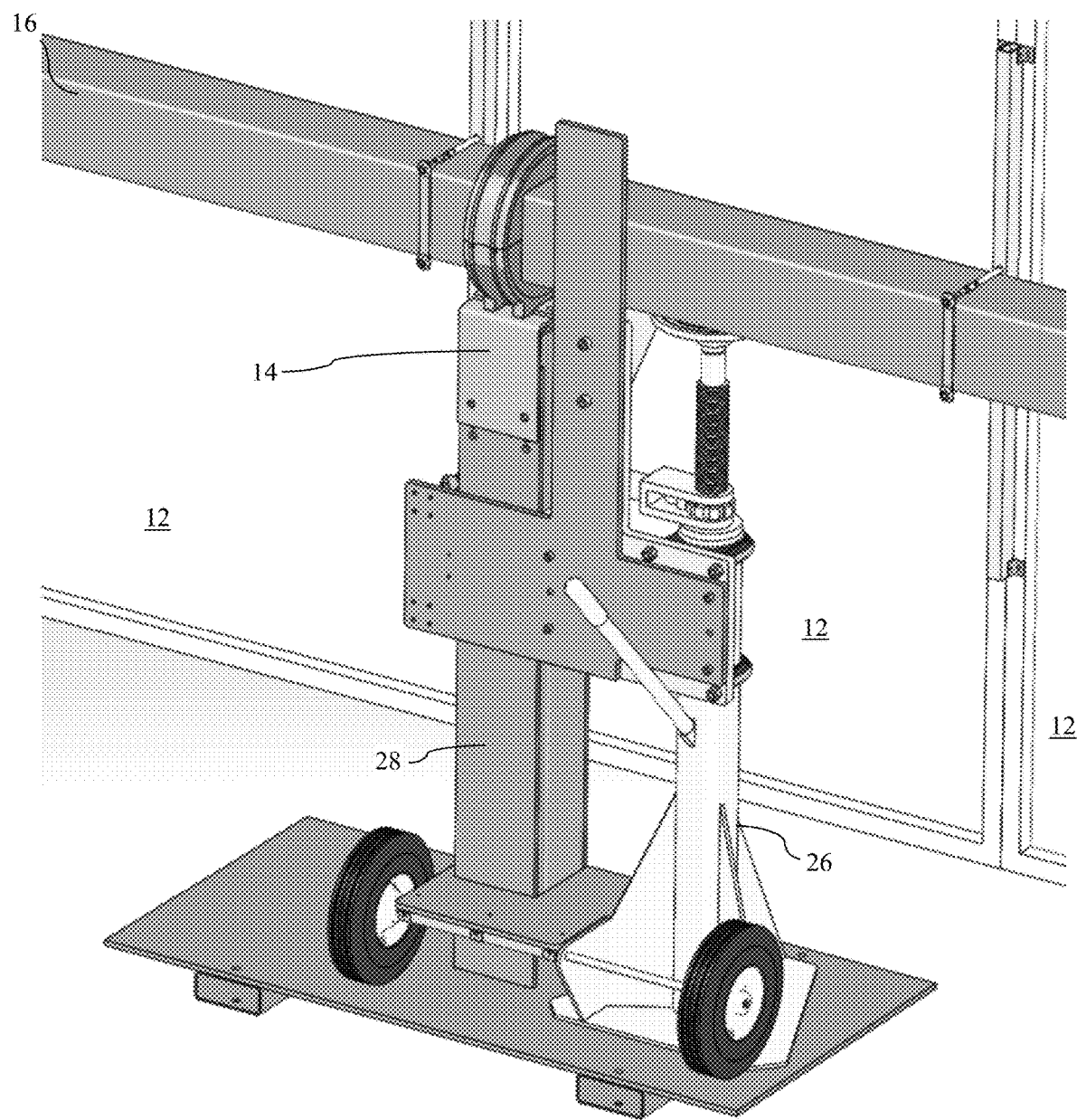
FIG. 4 is a perspective view showing posts, and the rails and the bearing subassemblies of a pre-assembly supported by a temporary support.

FIG. 4 is a perspective view showing the posts 28, and a pre-assembly 10 supported by a temporary support 26. While the pre-assembly 10 (e.g., the rail 16) rests on the temporary support 26, the workers can slide the bearing subassemblies 14 along the rail 16 to align bearing subassemblies 14 with the posts 28. Alternatively, one of the bearing subassemblies 14 may not be able to slide along the rail 16, and this one bearing subassembly may be aligned with the post 28 by displacing the pre-assembly 10 relative to one of the post 28 before resting the pre-assembly 10 on the temporary support 26. Then, the workers can slide the other bearing subassembly along the rail 16 to align the other bearing subassembly with the other posts 28. The workers can then adjust the height of the temporary support 26 so that the bearing subassemblies 14 registers with the respective tops of the posts 28, and connect the bearing subassemblies 14 to the posts 28. The connection may be achieved indirectly via one or more connecting parts, such as a connection plate joined to the bearing housing of the bearing subassemblies 14, and/or other connecting parts.

Finally, the workers can adjust the height of the temporary support 26 so that the posts 28 support the pre-assembly 10. Then, the workers can disengage the rail 16 of the pre-assembly 10 from the rail temporary support 26, and decouple the temporary support 26 from the posts 28. The temporary support 26 may then be moved to another post and used again to connect another pre-assembly 10 to posts 28.

Figure 5:
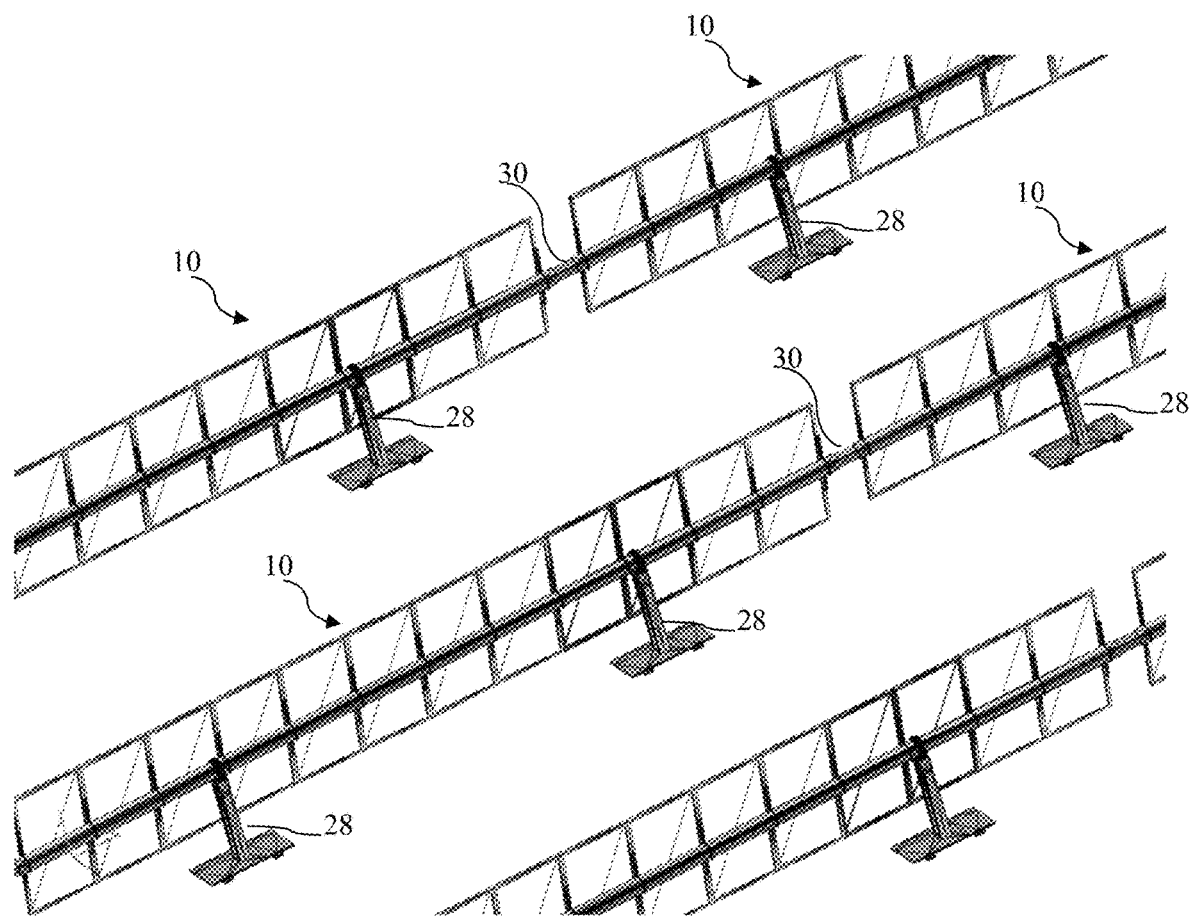
FIG. 5 is a perspective view of a plurality of pre-assemblies installed and coupled together on a solar farm.

FIG. 5 is a perspective view of a plurality of pre-assemblies 10 disposed on a solar farm. Since the pre-assemblies 10 have been pre-wired at the factory, the workers may only need to electrically couple the wirings of the pre-assemblies together, and, optionally, mechanically couple the pre-assemblies 10 together, for example using telescopic rails 30. In some embodiments, the workers may also need to couple the lines controlling the motorization to effect rotation of the pre-assemblies 10, and/or circuitry for washing the pre-assemblies 10.

Figure 6:
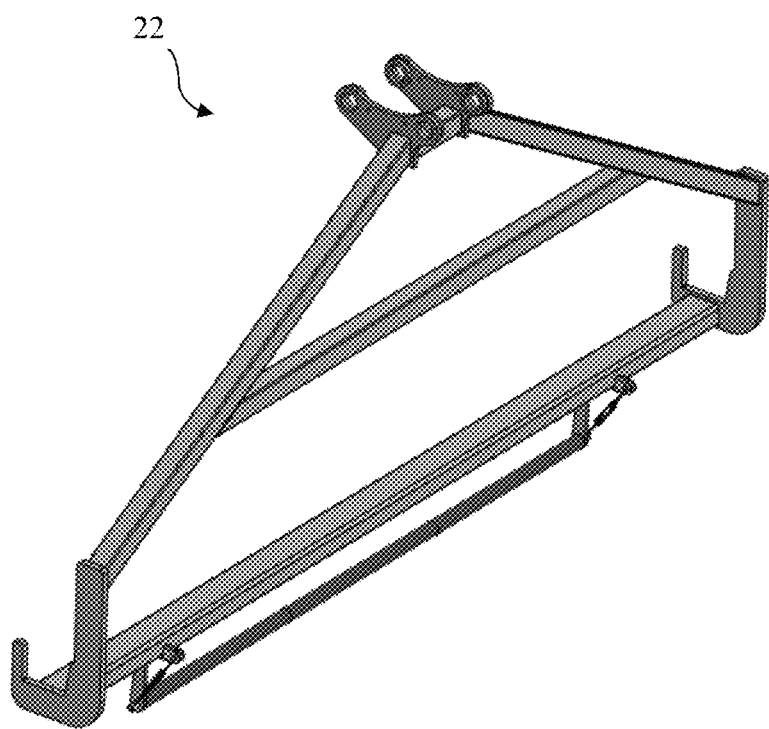
FIG. 6 is a perspective view of an example end-effector that can be used to lift a pre-assembly.

FIG. 6 is a perspective view of an example end-effector 22 that can be used to lift a pre-assembly 10.

Figure 7:
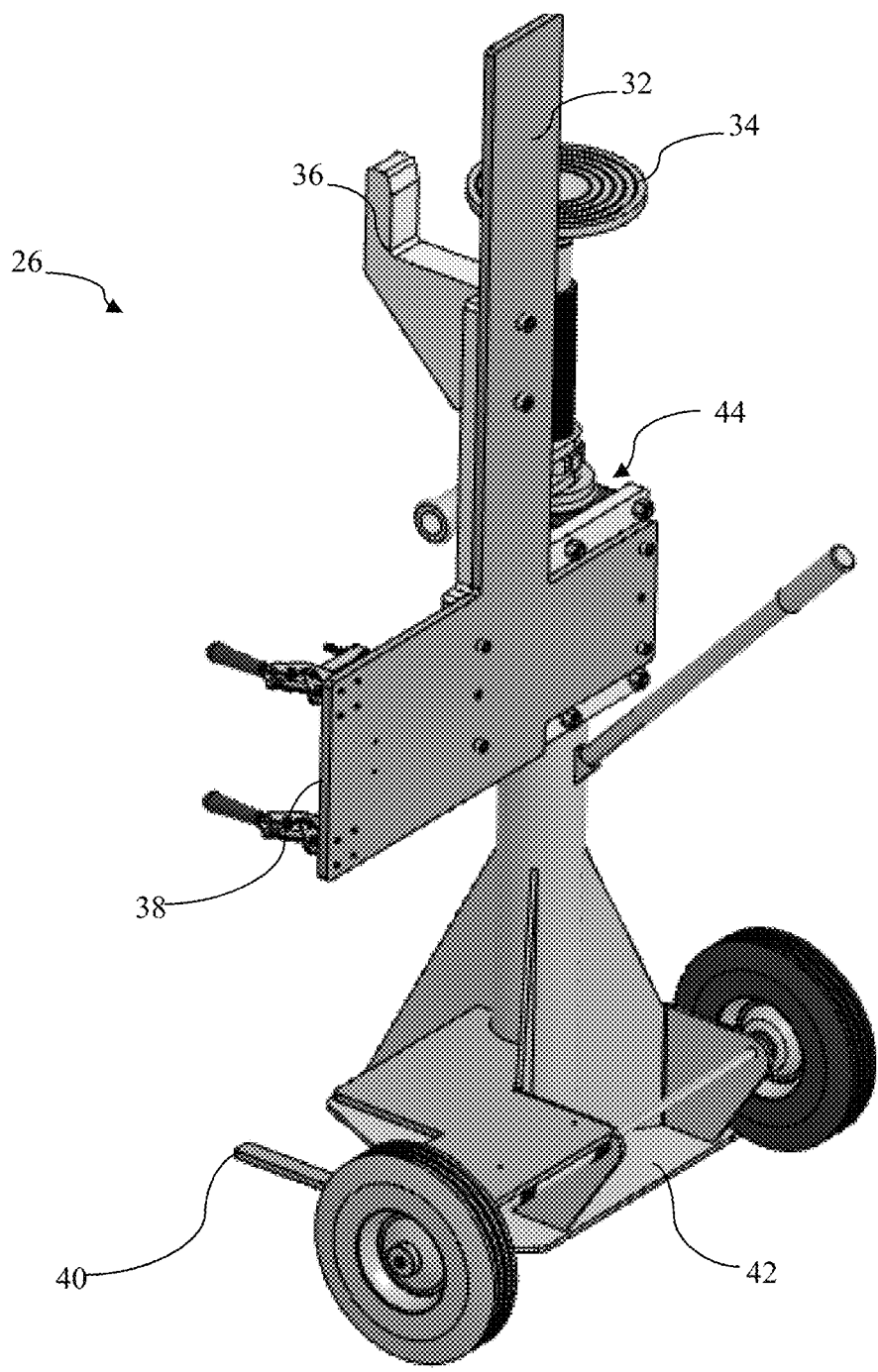
FIGS. 7 and 8 are perspective views of a temporary support.
Figure 8:
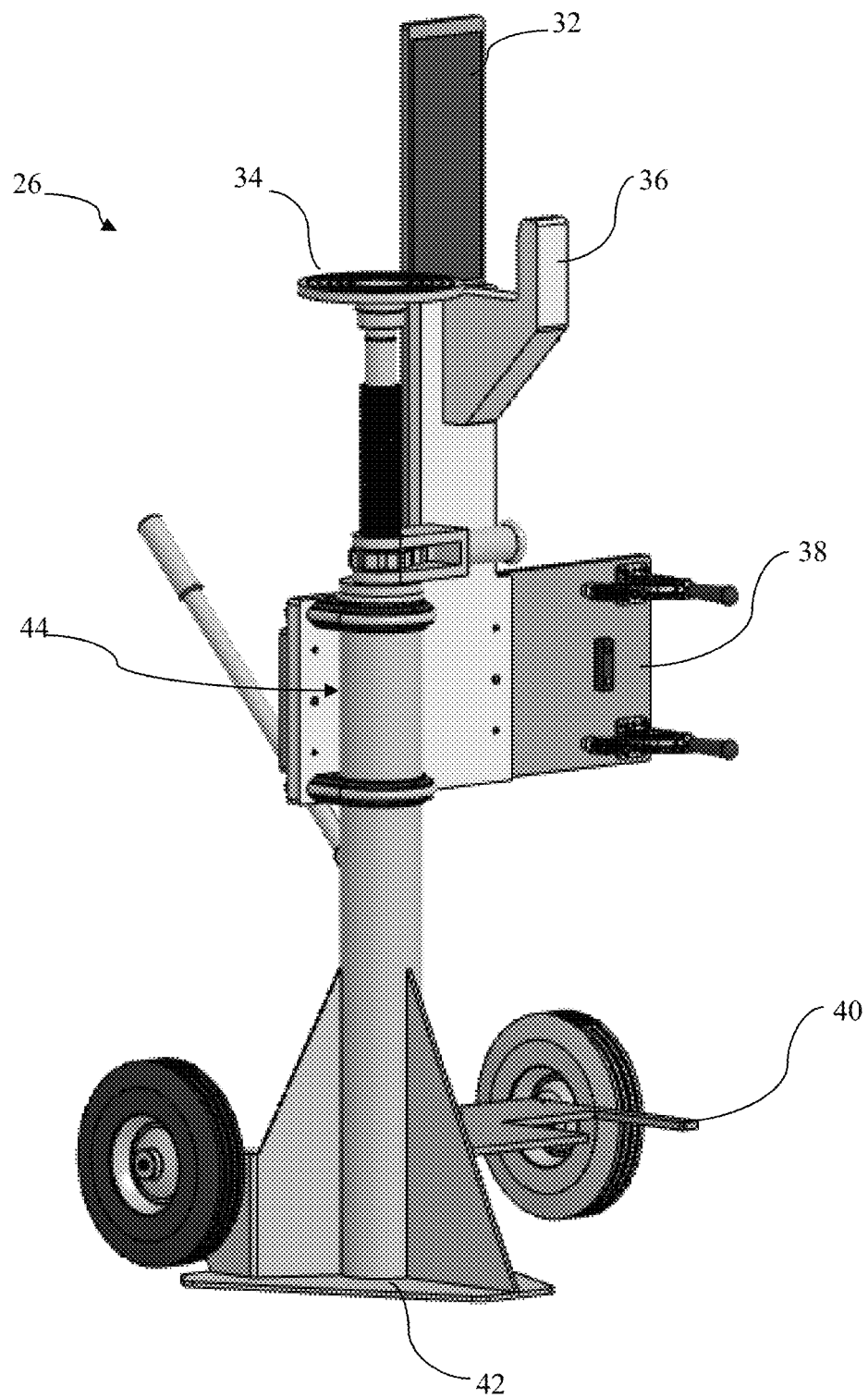

FIGS. 7 and 8 are perspective views of a temporary support 26. The temporary support 26 includes a stand having a foot 42 and a rest 34 located above the foot 42. The height of the rest 34 above the foot 42 is adjustable, such as by using a jack 44; however, other mechanisms may be used. Rail alignment means, including an alignment plate 32 and a receptacle 36, are secured to the stand. The stand can be connected to a post (not shown) using a guide plate 40, and a clamp plate 38. Other connection means to the post may also be used.

In use, the excavator lowers the pre-assembly while maintaining contact of the rail of the pre-assembly against the alignment plate 32 until the pre-assembly is supported on the adjustable rest 34. The rail engages the receptacle 36, which maintains the position of the rail above the post.

In some embodiments, the receptacle 36 is coupled to the stand via a quick-release connection, so that the rail can be rapidly disengaged once it is connected to the post.

While FIGS. 1-7 illustrate pre-assemblies 10 having only one rail component, in other embodiments, the pre-assemblies may include two or more rail components joined together. In such embodiments, some of the temporary supports 26 can be modified such that the rail can rotate with the receptacle 36. In use, the lower rail component of the pre-assemblies 10 may first rest on modified temporary supports. The lower rail component rotates in the receptacles as the pre-assemblies are further lowered by the excavator until another rail component rests on other temporary supports.

Figure 9:
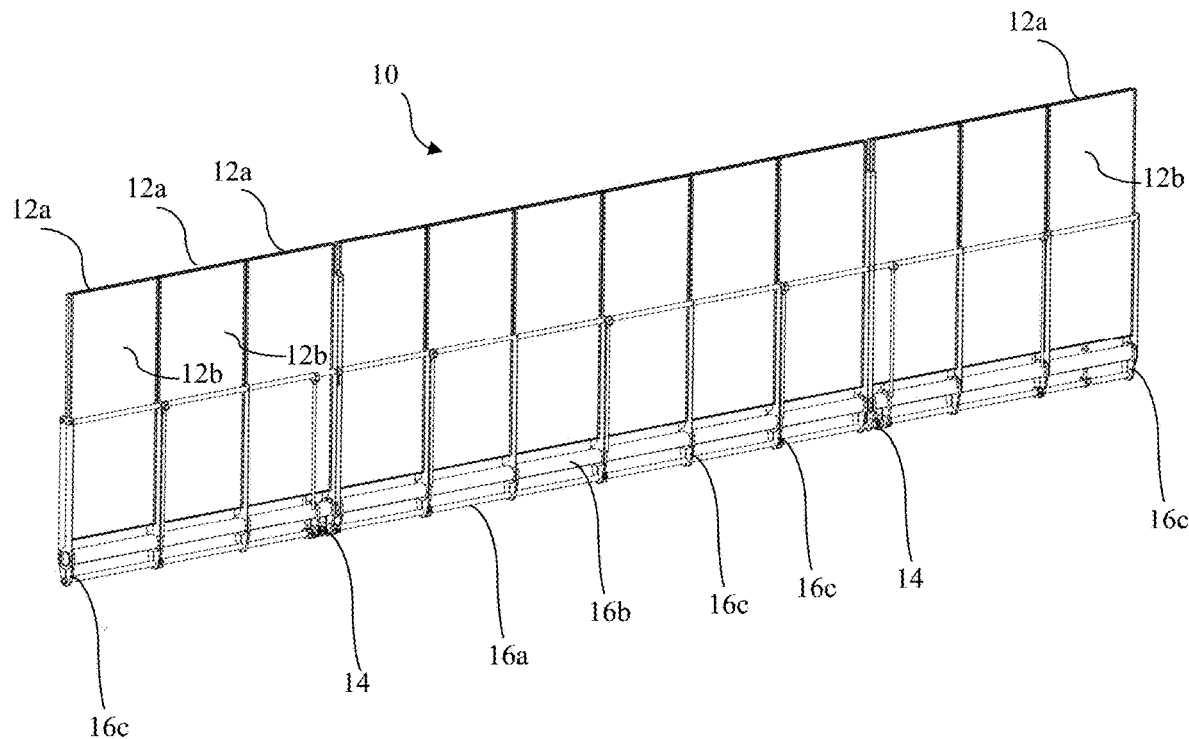
FIG. 9 is a perspective view of a foldable pre-assembly including a plurality of frames, a rail, and bearing subassemblies.

FIG. 9 is a perspective view of a foldable pre-assembly 10. Like the pre-assembly shown in FIG. 1, several of these pre-assemblies 10 are constructed, preferably in a factory.

The foldable pre-assembly 10 shown in FIG. 9 differs from the pre-assembly shown in FIG. 1 at least in that the rail includes an assembly including a first rail component 16a, onto which the bearing subassemblies 14 are mounted, a second rail component 16b, onto which the plurality of frames 12a and the plurality of frames 12b are mounted, and a plurality of clamps 16c joining the first rail component 16a to the second rail component 16b.

The foldable pre-assembly 10 shown in FIG. 9 also differs from the pre-assembly shown in FIG. 1 at least in that the bearing subassemblies 14 mounted to the rail 16, do not include a bearing housing. The bearing subassemblies 14 mounted to the rail 16 consist essentially of an outer bearing, an inner bearing that is coupled to the rail 16 and is movable relative to the outer bearing, and an optional seal.

Figure 13:
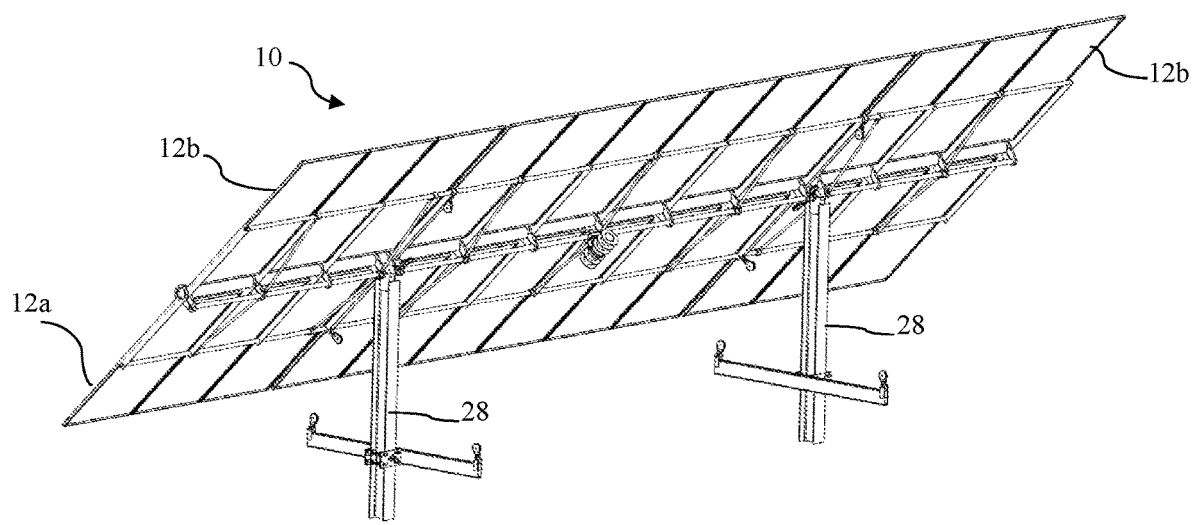
FIG. 13 is a perspective view of a foldable pre-assembly installed on a solar farm.

The foldable pre-assembly 10 shown in FIG. 9 further differs from the pre-assembly shown in FIG. 1 at least in that the plurality of frames 12a and/or the plurality of frames 12b are rotatably mounted to the second rail component 16b of the rail assembly. Thus, the plurality of frames 12a can be folded onto the plurality of frames 12b during shipping. During installation on a solar farm, the plurality of frames 12a is unfolded on one side of the rail assembly, and the plurality of frames 12b is unfolded on the other, opposite side of the rail assembly, such as shown in FIG. 13. Further free rotation of the plurality of frames 12a and/or the plurality of frames 12b around the second rail component 16b of the rail assembly is prevented, for example, by linking the plurality of frames 12a and/or the plurality of frames 12b to the first rail component 16a or the rail assembly. Also, the plurality of frames 12a can be joined to the plurality of frames 12b.

Like the pre-assembly shown in FIG. 1, at least one of the bearing subassemblies 14 of the foldable pre-assembly 10 shown in FIG. 9 can slide along the rail assembly to accommodate variations in the spacing between the posts on which they will be coupled.

Like the pre-assembly shown in FIG. 1, the panels(s) of photovoltaic cells may be pre-wired, and the wiring tested at the factory.

Figure 10:
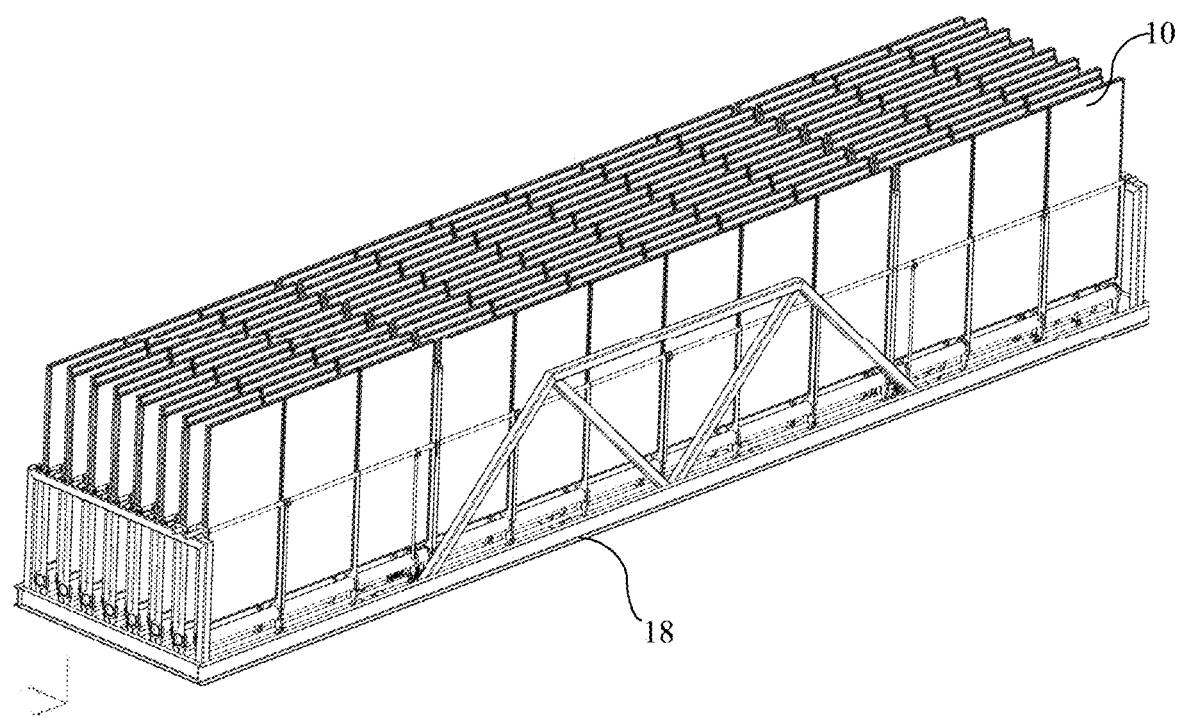
FIG. 10 is a perspective view of an arrangement of a plurality of foldable pre-assemblies on a trailer, wherein some of the pre-assemblies forming the arrangement are staggered relative to others of the pre-assemblies forming the arrangement.

FIG. 10 is a perspective view of an arrangement of a plurality of foldable pre-assemblies 10 on a trailer 18. The same arrangement of the plurality of foldable pre-assemblies may be used during the shipping of the plurality of foldable pre-assemblies 10 from the factory to the solar farm, and during the delivery of the foldable pre-assemblies 10 between two of three adjacent rows of posts secured into the ground at the solar farm. In this arrangement, the plurality of frames 12a (in FIG. 9) are folded onto the plurality of frames 12b (in FIG. 9). Optionally, some of the pre-assemblies forming the arrangement shown in FIG. 10 are horizontally staggered relative to others of the pre-assemblies forming the arrangement.

Figure 11:
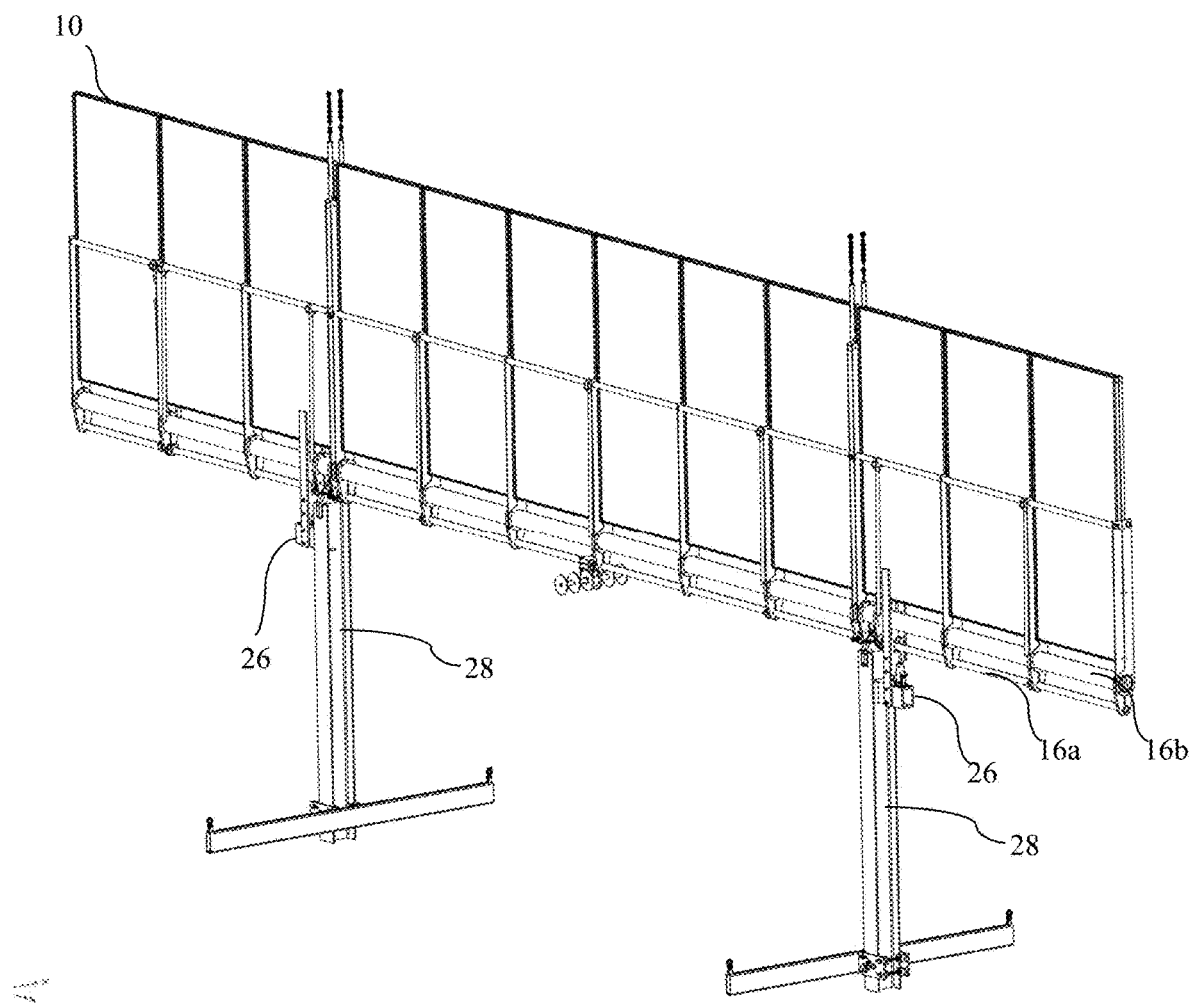
FIG. 11 is a perspective view of a foldable pre-assembly being lifted and positioned above posts secured into the ground, with temporary supports coupled to the posts.
Figure 12:
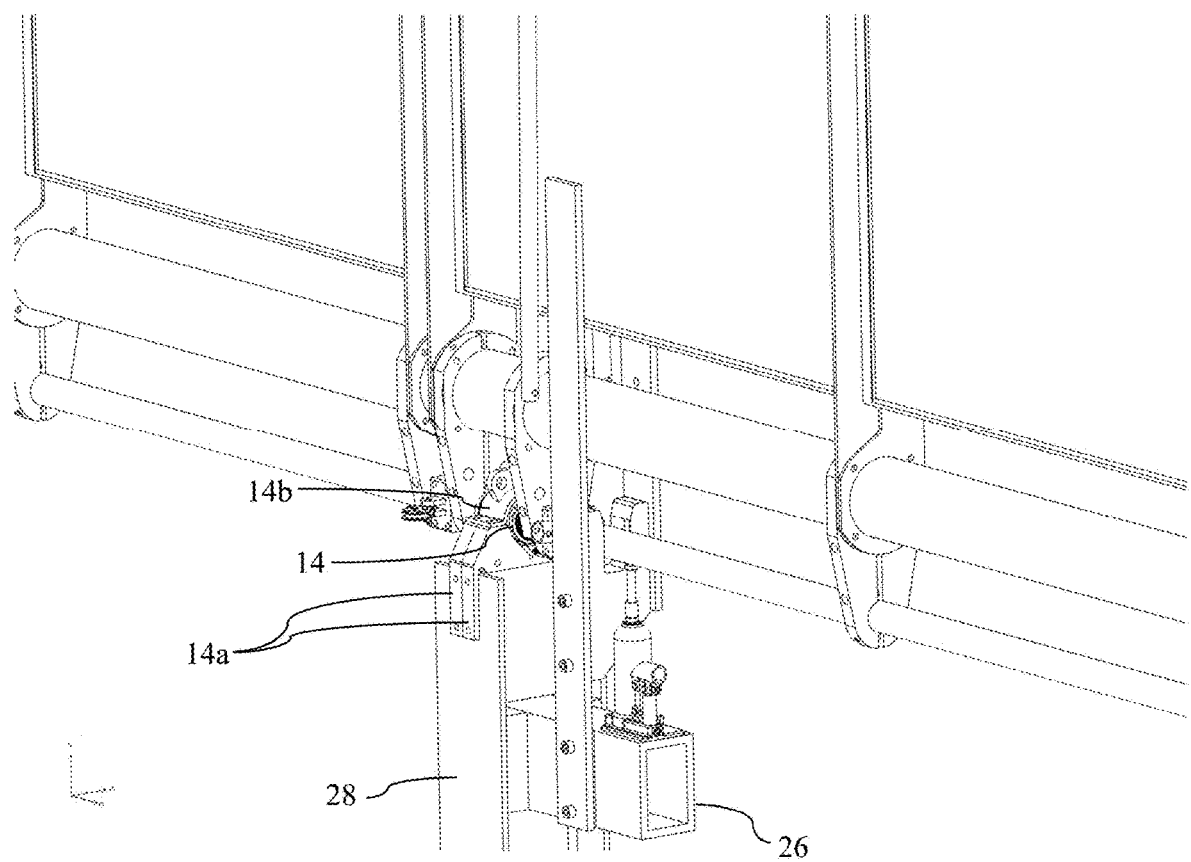
FIG. 12 is a perspective view showing posts, and the rails and the bearing subassemblies of a foldable pre-assembly supported by a temporary support.

FIG. 11 is a perspective view of a foldable pre-assembly 10 being lifted and positioned above posts 28 secured into the ground at the solar farm. The lifting means are not shown in FIG. 11. These lifting means may be similar to the standard lifting means previously disclosed herein. The lifting means may be equipped with a specialized end-effector, a spreader bar and a plurality of tension members, or other equipment capable of holding the rail assembly. This equipment may hold the first rail component 16 of the rail assembly, the second rail component 16b of the rail assembly, or both the first rail component 16 and the second rail component 16b of the rail assembly.

Similarly to FIG. 3, workers may have previously coupled a temporary support 26 to each post 28. The temporary support 26 is used to guide, and properly position the foldable pre-assembly 10 above the posts 28. However, as shown in FIG. 11, the temporary support 26 is smaller and more portable.

The positioning of the foldable pre-assembly 10 shown in FIG. 11 on the post 28 differs from the positioning of the pre-assembly shown in FIG. 4 at least in that workers may have previously coupled a first bearing housing portion 14a to each post 28. When the workers adjust the height of the temporary support 26, the posts 28 indirectly support the bearing subassemblies 14 of the foldable pre-assembly 10 via the first bearing housing portion 14a.

The connection of the foldable pre-assembly 10 shown in FIG. 11 to the post 28 differs from the connection of the pre-assembly shown in FIG. 4 at least in that a second bearing housing portion 14b, such as a bearing cap that is not mounted to the foldable pre-assembly 10 during the positioning of the foldable pre-assembly 10 on the post 28, is used to indirectly connect the bearing subassemblies 14 to the post 28.

In other embodiments, the bearing subassembly 14 may consist essentially of an inner bearing that is mounted to the rail assembly. Furthermore, the outer bearing may comprise first and second components jointed to the bearing housing portions 14a and 14b, respectively. For example, the first outer bearing component may be shaped like the lower profile of the inner bearing so that it can receive the inner bearing portion, and the second outer bearing component may be shaped like the upper profile of the inner bearing such that when the bearing housing portion 14b is connected to the bearing housing portions 14a, the first and second components of the outer bearing come in contact with and surround the inner bearing. In such embodiments, workers may couple the bearing housing portions 14a and the first outer bearing component joined thereto to each post 28. The workers may then align the bearing subassemblies 14 with the bearing housing portions 14a and the first outer bearing components previously coupled to the posts 28. Finally, the workers may connect the bearing housing portion 14b and the second outer bearing component joined thereto to the outer bearing portion 14a and the first outer bearing component.

FIG. 13 is a perspective view of a foldable pre-assembly 10 installed on a solar farm. As mentioned before, the plurality of frames 12a has been unfolded on one side of the rail assembly, the plurality of frames 12b has been unfolded on the other, opposite side of the rail assembly, and free rotation of the plurality of frames 12a and/or the plurality of frames 12b around the rail assembly is prevented.

Since the foldable pre-assemblies 10 have been pre-wired at the factory, the workers may only need to electrically couple the wirings of the pre-assemblies together. In some embodiments, the workers may also need to couple the lines controlling the motorization to effect rotation of the pre-assemblies 10, and/or circuitry for washing the pre-assemblies 10.

In the embodiment shown in FIG. 13, the foldable pre-assembly 10 is not mechanically coupled to other foldable pre-assemblies.

Figure 14:
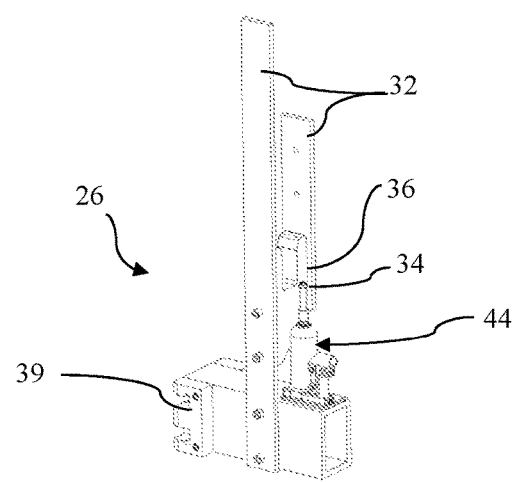
FIG. 14 is perspective views of a portable temporary support.

FIG. 14 is a perspective view of a portable temporary support 26. The portable temporary support 26 shown in FIG. 14 differs from the temporary support shown in FIGS. 7 and 8 at least in that it does not include a foot 42, and the portable temporary support 26 can be connected to a post (not shown) using an alignment assembly 39.

It should be appreciated that the temporary support shown in FIGS. 7 and 8 could alternatively be used with the foldable pre-assembly 10 shown in FIGS. 9-13, and conversely, the portable temporary support 26 shown in FIG. 14 could alternatively be used with the pre-assembly 10 shown in FIGS. 1-5.

While the posts 28 are described herein as being secured into the ground, the post may be secured into any suitable medium for securing solar panels, including concrete slabs, or metallic frames.

The disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A method of installing solar panels, comprising:
forming a plurality of pre-assemblies at a first site, wherein each of the plurality of pre-assemblies includes a plurality of frames, and a rail, each of the plurality of frames holding a panel of photovoltaic cells, and each of the plurality of frames being mounted to the rail, wherein each of the plurality of pre-assemblies further includes bearing subassemblies mounted to the rail, wherein the rail includes a plurality of laterally offset rail components joined to one another, wherein the bearing subassemblies are mounted to a first one of the plurality of laterally offset rail components, and wherein the plurality of frames are mounted to a second one of the plurality of laterally offset components;
lifting one of the plurality of pre-assemblies to a position above posts secured at a second site, the second site being remote from the first site;
coupling one of a plurality of first bearing housing portions to each of the posts;
supporting the bearing subassemblies of the one of the plurality of pre-assemblies with the posts via the plurality of first bearing housing portions; and
connecting the one of the plurality of pre-assemblies to the posts by connecting a second bearing housing portion to each of the first plurality of bearing housing portions.

2. The method of claim 1, wherein the first site is a factory and the second site is a solar farm.

3. The method of claim 2, further comprising forming an arrangement of the plurality of pre-assemblies on a transportation means at the first site, wherein some of the pre-assemblies forming the arrangement are staggered relative to others of the pre-assemblies forming the arrangement.

4. The method of claim 1, further comprising:
transporting each of the plurality of pre-assemblies from the first site to the second site using a transportation means;
connecting each of the plurality of pre-assemblies to posts secured at the second site; and
electrically coupling the plurality of pre-assemblies to one another.

5. The method of claim 1, further comprising sliding at least one of the bearing subassemblies along the rail of the one of the plurality of pre-assemblies.

6. The method of claim 1, wherein each of the plurality of frames is rotatably mounted to the second one of the plurality of rail components, the method further comprising unfolding some of the plurality of the frames of the one of the plurality of pre-assemblies on one side of the rail, and others of the plurality of frames of the one of the plurality of pre-assemblies on the other, opposite side of the rail after the one of the plurality of pre-assemblies is connected to the posts.

7. The method of claim 1, wherein
either each of the bearing subassemblies consists essentially of an inner bearing coupled to the rail and an outer bearing movable relative to the inner bearing;
or each of the bearing subassemblies consists essentially of an inner bearing coupled to the rail, and one of a plurality of outer bearing components is joined to each of the first plurality of bearing housing portions and to the second bearing housing portion.

8. A method of installing solar panels, comprising:
providing a pre-assembly, the pre-assembly including a plurality of frames, and a rail, each of the plurality of frames holding a panel of photovoltaic cells, each of the plurality of frames being mounted to the rail;
coupling a temporary support to a post secured at an installation site, the temporary support including a stand having a foot and a rest located above the foot at a height that is adjustable, a rail alignment means secured to the stand, and a rail receptacle secured to the stand;
lifting the pre-assembly to a position above the post;
lowering the pre-assembly while maintaining contact of the rail of the pre-assembly against the rail alignment means;
engaging the rail with the rail receptacle;
supporting the pre-assembly on the adjustable rest;
adjusting the height of the rest so that the pre-assembly registers with a top of the post; and
connecting the pre-assembly to the post.

9. The method of claim 8, further comprising:
adjusting the height of the rest so that the post supports the pre-assembly;
disengaging the rail from the rail receptacle; and
decoupling the temporary support from the post.

10. The method of claim 9, wherein lifting the pre-assembly to the position above the post is performed using an excavator connected to an end effector.

11. The method of claim 9, wherein lifting the pre-assembly to the position above the post is performed using a lifting means having a precision that is lower than a precision required of robots that use fixed axis systems and dedicated mounting structures to install panels.

12. The method of claim 8, wherein the rail includes a plurality of laterally offset rail components joined to one another, wherein the bearing subassembly is mounted to a first one of the plurality of laterally offset rail components, and wherein the plurality of frames are rotatably mounted to a second one of the plurality of laterally offset rail components, the method further comprising unfolding some of the plurality of the frames on one side of the rail, and others of the plurality of frames on the other, opposite side of the rail after the pre-assembly is connected to the post.

13. The method of claim 12, wherein the pre-assembly further including a bearing subassembly mounted to the rail, the method further comprising:
coupling a first bearing housing portion to the post; and
supporting the bearing subassembly with the post via the first bearing housing portion;
wherein the pre-assembly is connected to the post by connecting a second bearing housing portion to the post to the first bearing housing portion.

14. The method of claim 13, wherein
either the bearing subassembly consists essentially of an inner bearing coupled to the rail and an outer bearing movable relative to the inner bearing;
or the bearing subassembly consists essentially of an inner bearing coupled to the rail, a first outer bearing component is joined to the first bearing housing portion, and a second outer bearing component is joined to the second bearing housing portion.

15. The method of claim 13, wherein the pre-assembly is indirectly connected to the post via one or more of an inner bearing coupled to the rail, an outer bearing movable relative to the inner bearing, and a bearing housing coupled to the outer bearing, the bearing housing including the first bearing housing portion connected to the second bearing housing portion.

16. A pre-assembly for expediting installation of solar panels, comprising:
- a plurality of frames, each of the plurality of frames holding a panel of photovoltaic cells;
- a rail, wherein each of the plurality of frames is mounted to the rail; and
- bearing subassemblies mounted to the rail,
- wherein each of the plurality of frames is rotatably mounted to the rail,
- wherein the rail includes a plurality of laterally offset rail components joined to one another,
- wherein the bearing subassemblies are mounted to a first one of the plurality of laterally offset rail components,
- wherein the plurality of frames are mounted to a second one of the plurality of laterally offset rail components,
- wherein the pre-assembly is not connected to any post secured at an installation site, and wherein each of the plurality of frames is rotatably mounted to the second one of the plurality of rail components.

17. The pre-assembly of claim 16, wherein each of the plurality of frames is pre-wired.

18. The pre-assembly of claim 16, wherein each of the bearing subassemblies comprises an inner bearing coupled to the first one of the plurality of laterally offset rail components.

19. The pre-assembly of claim 16, wherein at least one bearing subassemblies is capable of sliding along the rail.

* * * * *